United States Patent [19]

Matsubara

[11] 4,452,204

[45] Jun. 5, 1984

[54] SPARK TIMING CONTROL DEVICE FOR AN INTERNAL COMBUSTION ENGINE

[75] Inventor: Yuji Matsubara, Yokohama, Japan

[73] Assignee: Nissan Motor Company, Limited, Kanagawa, Japan

[21] Appl. No.: 432,676

[22] Filed: Oct. 4, 1982

Related U.S. Application Data

[63] Continuation of Ser. No. 141,980, Apr. 21, 1980, abandoned.

[30] Foreign Application Priority Data

Apr. 21, 1979 [JP] Japan ............................. 54-49469

[51] Int. Cl.³ ............................................. F02P 5/00
[52] U.S. Cl. ................................... 123/417; 123/416
[58] Field of Search ...................... 123/416, 417, 415

[56] References Cited

U.S. PATENT DOCUMENTS

| | | |
|---|---|---|
| 3,678,904 | 7/1972 | Scholl et al. |
| 3,871,342 | 3/1975 | Fujinami et al. |
| 3,942,491 | 3/1976 | Seite et al. |
| 3,996,911 | 12/1976 | Canup |
| 4,088,197 | 4/1977 | Salway |
| 4,081,995 | 4/1978 | Griffith et al. |
| 4,112,887 | 9/1978 | Chateau ........................ 123/416 |
| 4,157,699 | 6/1979 | Mori ............................. 123/417 |
| 4,169,438 | 10/1979 | Iwase et al. |
| 4,175,506 | 11/1979 | Sakamoto et al. ............ 123/416 |
| 4,196,705 | 4/1980 | Hattori et al. |
| 4,204,256 | 5/1980 | Klotzner |
| 4,244,339 | 1/1981 | Gorille .......................... 123/416 |
| 4,261,313 | 4/1981 | Iwata et al. ................... 123/416 |

FOREIGN PATENT DOCUMENTS

| | | |
|---|---|---|
| 2418547 | 11/1974 | Fed. Rep. of Germany. |
| 2823659 | 12/1978 | Fed. Rep. of Germany. |
| 2732781 | 2/1979 | Fed. Rep. of Germany. |
| 1473214 | 5/1977 | United Kingdom. |
| 1482626 | 8/1977 | United Kingdom. |
| 1497539 | 1/1978 | United Kingdom. |
| 2042637 | 9/1980 | United Kingdom ............ 123/417 |

*Primary Examiner*—Parshatam S. Lall
*Attorney, Agent, or Firm*—Lowe, King, Price & Becker

[57] ABSTRACT

A spark timing control device for an internal combustion engine includes a memory storing plural signals representing first and second sets of time durations beginning with reference positions and extending to sparking as a function of engine speed and load. In response to the engine speed being less than and greater than a predetermined value, first and second sets of spark time durations are read from the memory. First and second clock pulse generators derive first and second clock pulse signals; the period of the second pulse signal being less than that of the first signal. One of the first and second clock pulse signals is selected in response to the engine speed being respectively less than and greater than the predetermined value. Clock pulses of the selected clock pulse signal are counted. When the number of counted clock pulses equals the value representing the determined time duration a spark signal is generated. The first and second sets of time durations have first and second predetermined relations of count values to angular deviation between the reference position and the onset of sparking. The first and second predetermined relationships are such that for adjacent values of engine speed for the same load corresponding angular deviations have count values with a predetermined ratio; the ratio increases for the higher adjacent engine speed value. The first and second clock pulses have frequencies differing from each other by the predetermined ratio.

5 Claims, 4 Drawing Figures

FIG. 3

ENGINE ROTATIONAL SPEED (rpm)

| ENGINE INTAKE PIPE VACUUM PRESSURE (mmHg) | 100 | 200 | 400 | 800 | 812.5 | 1200 | 2000 | 2800 | 3600 | 4400 | 5200 | 6000 |
|---|---|---|---|---|---|---|---|---|---|---|---|---|
| -460 | 208 / 10° | 104 / 10° | 52 / 10° | 25 / 12° | 196 / 12° | 111 / 20° | 23 / 46° | 12 / 50° | 8 / 51° | 6 / 52° | 5 / 52° | 4 / 52° |
| -400 | 208 / 10° | 104 / 10° | 52 / 10° | 23 / 15° | 185 / 15° | 86 / 29° | 23 / 46° | 11 / 51° | 8 / 51° | 6 / 52° | 4 / 53° | 4 / 53° |
| -340 | 208 / 10° | 104 / 10° | 51 / 11° | 20 / 21° | 160 / 21° | 72 / 34° | 28 / 43° | 12 / 50° | 10 / 49° | 8 / 50° | 6 / 50° | 5 / 51° |
| -280 | 208 / 10° | 104 / 10° | 49 / 13° | 21 / 20° | 164 / 20° | 83 / 30° | 33 / 40° | 18 / 45° | 15 / 44° | 11 / 45° | 9 / 46° | 7 / 47° |
| -220 | 208 / 10° | 104 / 10° | 48 / 14° | 21 / 20° | 164 / 20° | 97 / 25° | 43 / 34° | 24 / 40° | 20 / 38° | 17 / 38° | 11 / 43° | 9 / 49° |
| -160 | 208 / 10° | 104 / 10° | 49 / 13° | 23 / 15° | 185 / 15° | 113 / 19° | 52 / 29° | 36 / 30° | 28 / 30° | 23 / 29° | 13 / 40° | 11 / 40° |
| -100 | 208 / 10° | 104 / 10° | 51 / 11° | 24 / 13° | 192 / 13° | 125 / 15° | 58 / 25° | 37 / 29° | 29 / 29° | 24 / 28° | 18 / 32° | 15 / 33° |
| -40 | 208 / 10° | 104 / 10° | 52 / 11° | 26 / 11° | 201 / 11° | 131 / 13° | 65 / 21° | 40 / 26° | 31 / 26° | 26 / 26° | 22 / 26° | 19 / 26° |

400μs-CLOCK PULSE PERIOD ⟵⟶ 50μs-CLOCK PULSE PERIOD

SPARK TIMING CONTROL DEVICE FOR AN INTERNAL COMBUSTION ENGINE

This is a continuation, of application Ser. No. 141,980 filed Apr. 21, 1980, now abandoned.

BACKGROUND OF THE INVENTION

The present invention relates to a spark timing control device for an internal combustion engine, and more particularly, to improvements thereto.

In order to make the actual spark timing of an internal combustion engine correspond as close as possible to the required characteristic thereof, which changes as a function of engine operating conditions, electronic spark timing control devices using a microcomputer have been developed to replace mechanical spark advance angle control devices.

One such electronic control devices uses time-chopping spark timing control. In this device, optimal spark timing advance angles depending on various instantaneous operational states of the engine, such as, for example, various engine speeds and intake vacuum pressure, are stored in advance in a memory table (ROM). In this case, each spark timing advance angle value is actually stored as a number of clock pulses representing the spark preparation time duration starting when a crankshaft is at a standard reference angle position and ending at the time of spark occurrence. A reference angle sensor derives a reference angle pulse whenever the crankshaft turns through a certain angle, for example, in the case of a 6-cylinder engine, 120°, corresponding to the spark timing difference between any two adjacent cylinders. Each time this reference angle pulse is produced, an optimal spark preparation time duration representative value corresponding to the intake vacuum pressure and the rotational speed (determined from the reference angle pulses) at that time is read out of the memory table. A spark signal is produced when a time duration representative value read from the memory table is reached by the time duration value; the time duration starts when the reference angle pulse is produced.

In this prior art device, a fixed-frequency clock pulse generator produces clock pulses which are counted from the moment when the reference angle pulse is produced. The spark is produced when the number of counted clock pulses coincides with the time duration representing value read out of the table memory.

As the engine speed decreases, the time required for the crankshaft to turn from the reference angle pulse position to the desired spark angular position increases so that a relatively large number of clock pulses occur as the shaft turns between the two positions. Usually, the frequency of the clock pulses is set relatively high, so that sufficient accuracy is obtained for relatively high crankshaft speed. Thus there is a need to count a relatively very large number of pulses in the relatively low rotational-speed region, thereby requiring a large capacity counter. Further, the processing tends to become complicated since such a large number of pulses must be handled.

SUMMARY OF THE INVENTION

It is therefore an object of the present invention to provide a spark timing control device for an internal combustion engine wherein the frequency of a clock pulse signal determining spark timing is switched, to correspond properly to lower and higher rotational speed operational regions of the engine, without impairing the accuracy of the spark timing control.

Another object of the present invention is to provide a spark timing control device for an internal combustion engine wherein a time duration counter for determining the spark timing has reduced capacity, and the mechanism for determining the spark timing is simplified.

BRIEF DESCRIPTION OF THE DRAWINGS

Other objects, features and advantages of the present invention will be apparent from the following description, taken in conjunction with the accompanying drawings, which are given by way of example only, and are not intended to be limitative of the present invention. In the drawings:

FIG. 3 is an illustration of the contents of a memory table used in the FIG. 1 device.

DETAILED DESCRIPTION OF THE PREFERRED EMBODIMENT

Figure 1:
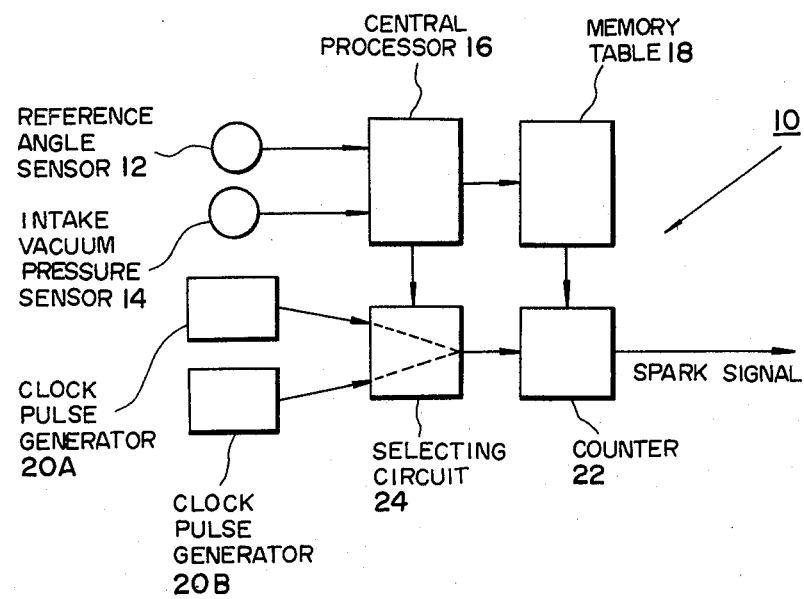
FIG. 1 is a block diagram of a preferred embodiment of the spark timing control device according to the present invention.

Referring to FIG. 1, a spark timing control device 10 includes reference angle sensor 12 for deriving a reference angle pulse in response to a crankshaft (not shown) rotating through a predetermined angle; for example, one pulse is derived at a position 60° before the compression top dead center of each cylinder, and successively pulses from sensor 12 are sequentially displaced at intervals of 120°.

An intake vacuum sensor 14 senses the engine intake vacuum pressure. A central processor 16 calculates the engine rotational speed from at least the latest pair of successive reference angle pulse intervals. The processor 16 determines a parameter corresponding to the operational state of the engine from the current engine rotational speed and the current intake vacuum value derived from the intake vacuum sensor 14. Processor 16 derives an output signal having a magnitude corresponding to the determined parameter and supplies it to a memory table 18.

Previously stored in the table 18 are time duration representing pulse count values, each depending on an optimal spark timing advance angle and representing an optimal spark preparation time duration, corresponding to the rotational speed of the engine and the intake vacuum pressure at that time; that is, the number of reference pulses representing the angle from the position corresponding to a reference angle pulse occurence time to a required spark timing position before top dead center.

The number of pulses read from the table 18 in response to the parameter indicating output signal of processor 16 is fed to a register or counter 22, also responsive to pulse from one of clock pulse generators 20A or 20B which derive pulse having different periods. Selection of generator 20A or 20B is determined according to the engine rotational speed as described hereafter in more detail. The counter 22 begins counting clock pulses, approximately when the reference angle pulse is derived, as seen from FIG. 2 (b) and (g). The counter 22 derives a spark signal when the count accumulated therein coincides with the number of pulses read from the table 18.

Contacts, not shown, of a selecting circuit 24 are selectively switched according to the rotational speed of the engine calculated by the central processor 16. For example, when the rotational speed of the engine is not higher than 800 rpm, a low-frequency clock signal, having a period of 400 μs from the generator 20A, (a high enough frequency not to deteriorate the accuracy of determining spark timing) is supplied to the register 22; however, for a rotational speed exceeding 800 rpm, a high-frequency clock signal having a period of 50 μs (a frequency high enough to secure sufficient accuracy of determining the spark timing) is supplied by generator 20B to a count input of register 22.

The stored contents of two regions of table 18 are separated by a border at 800 rpm. The memory contents are predetermined according to the periods of the clock pulse generators 20A and 20B, as shown in FIG. 3.

Finally, the spark signal from the register 22 is fed to an ignition device, not shown, for igniting purposes.

Figure 2:
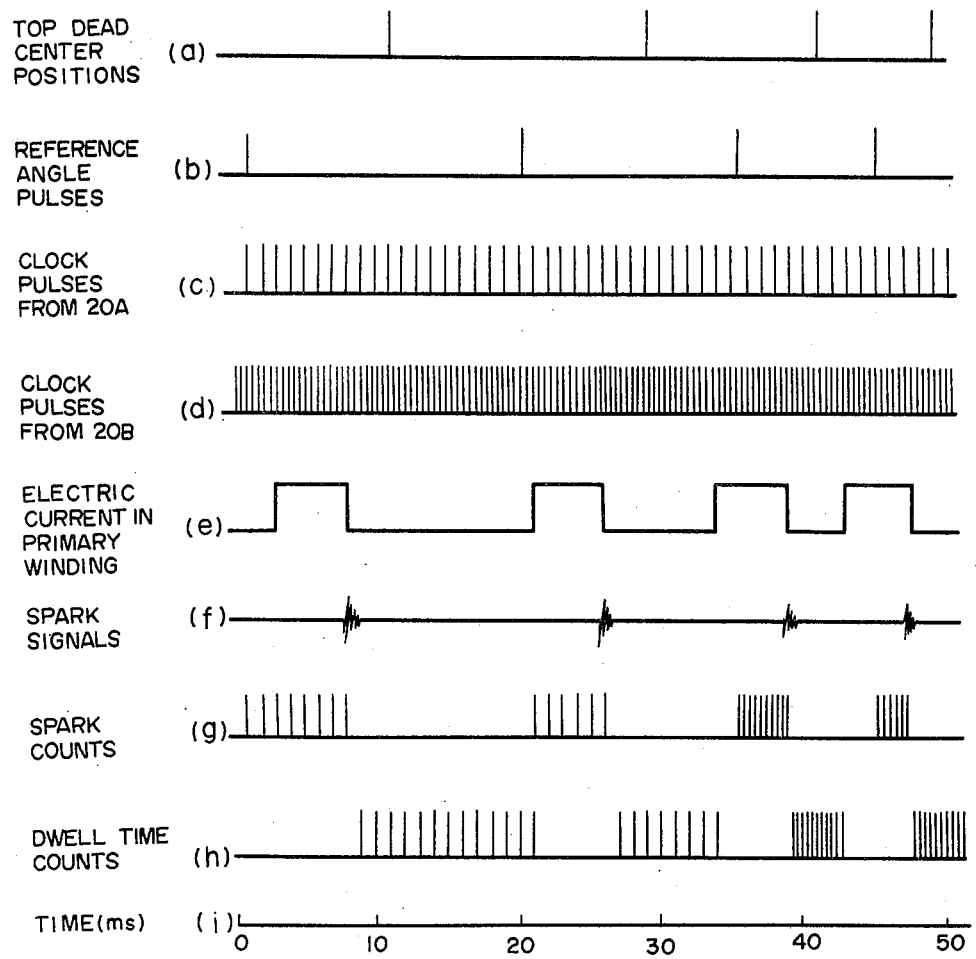
FIG. 2 is a time chart of the operation of the device of FIG. 1.

Referring to FIG. 2, and particularly, to the spark signal waveform of FIG. 2 (f), the first two ignitions are for an engine rotational speed no higher than 800 rpm; in this case, clock pulses from the clock pulse generator 20A are counted to determine of ignition timing. On the other hand, the last two ignitions of FIG. 2 (f) are for an engine rotational speed exceeding 800 rpm; in this case; clock pulses from the generator 20B are counted to determine ignition timing.

In FIG. 3 are the entries of the table 18 for values representing optimal spark advance angle value (shown in a lower position in each column) corresponding to each pair of engine values of rotational speed and engine intake vacuum pressure (herein an intake manifold depression or intake pipe vacuum pressure in the at that time), and the number of counted clock pulses (shown in an upper position in the column) depending on the optimal spark advance angle value and representing the optimal spark preparation time duration. The clock pulses for an engine rotational speed no higher than 800 rpm have a period of 400 μs, while the clock pulses for an engine rotational speed higher than 800 rpm have a period of 50 μs.

As will be seen from the table, for a low engine speed a clock pulse signal having a relatively long period. For example, a maximum number of pulses is 208 for an engine rotational speed of 100 rpm, and an intake pipe vacuum pressure of −460 mmHg. If the time duration corresponding to this given number is counted in response to clock pulses having a period of 50 μs, which is one eighth of the 400 μs. 1664 (=208×8) pulses must be counted. That is, clock pulses having a relatively long period are switched to counter 22 for a low engine rotational speed, whereby the required number of counts and therefore the capacity of the register are greatly decreased.

In this particular embodiment, the intake vacuum pressure in the intake pipe is a variable representing the load state of the engine. However in an electronically controlled fuel injection engine, the pulse width of a fuel injection pulse signal controls the amount of fuel fed to the engine, and intake air flow or the extent a throttle valve (provided in the intake passage to the engine) is open may be used as a variable indicating the engine load.

Figure 4:
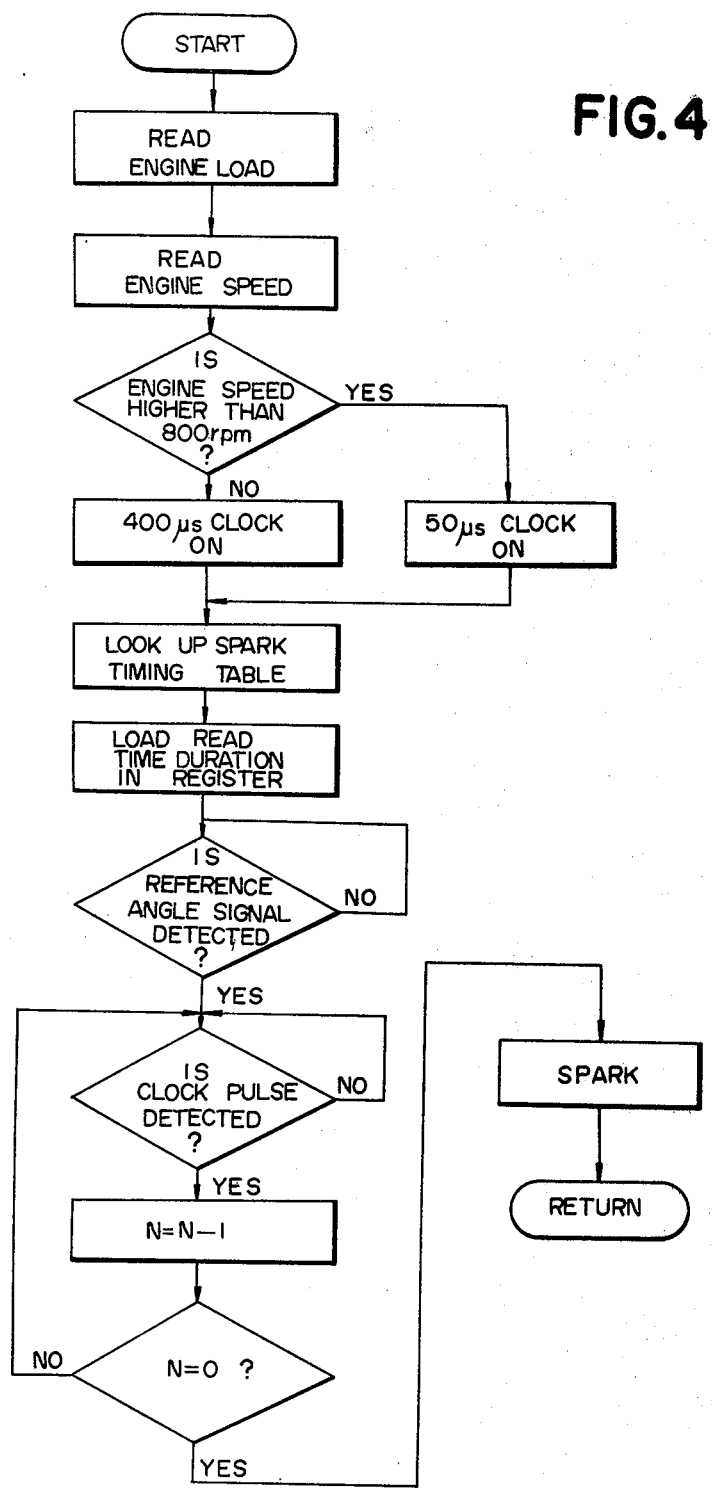
FIG. 4 is a flowchart of the instructions executed by a central processor of the device of FIG. 1.

Next, the entire operation of the device is described by referring to the flowchart of FIG. 4.

First, the engine load and the rotational speed are read into the memory 18.

When the rotational speed of the engine is higher than 800 rpm, clock pulses having a period of 50 μs are fed from generator 20B to the register 22, while, when the rotational speed is not higher than 800 rpm, clock pulses having a period of 400 μs are fed from generator 20A to the register 22.

Then central processor 16 supplies a signal to look up table 18 (FIG. 3) so the table derives a number of pulses, N, representing the optimal spark preparation time duration. The value of N depends on the optimal spark advance angle value corresponding to the current engine load and the rotational speed of the engine. The number N is set in the register 22 and then is sequentially counted down from the time when the reference angle pulse is detected until the time when N =0, at which time, ignition is effected.

When the spark timing is fixed, the primary ignition coil is fed with electric current for a time duration, (that is, the dwell time) that may be controlled in the same way as mentioned above; by switching the clock pulses from two sources having different frequencies, according to the rotational speed of the engine, and counting clock pulses from the selected source until the count value coincides with the number of pulses, dependent on a minimum necessary current feed time duration, obtained from calculation or looking up of a memory table used for this purpose, the duration of electric current to the ignition coil is controlled.

Although the present invention has been shown and described with reference to a particular embodiment thereof, and with reference to the illustrative drawings, it should not be conceived of as limited thereto; various alterations, omissions, and modifications to the form and the content of any particular embodiment could be made therein, without departing from the spirit of the invention, or from its scope; and it is therefore desired that this scope should be defined not by any particular features of the shown embodiment (which was given, as were the drawings, for the purposes of elucidation only), but solely by the accompanying claims.

What is claimed is:

1. Apparatus for controlling the occurrence time of ignition sparking for a piston in a cylinder of an internal combustion engine comprising means for deriving a signal when the piston has a predetermined stroke position, means for deriving signals indicative of engine loading and speed, means responsive to the load and speed indicating signals for deriving a signal indicative of a desired count between the occurrence time of the predetermined stroke position and the desired time of ignition sparking, the last named means including: a two dimensional table having $x_1 \ldots x_N$ and $y_1 \ldots y_M$ inputs for addressing $x_N \cdot y_M$ entries, each entry representing a desired count value between the time of the predetermined stroke position and the desired spark time, the x and y inputs being respectively responsive to magnitudes represented by the engine loading and speed signals, all of the entries at positions $x_1 \ldots x_k$ for engine speeds greater than a predetermined speed value having a first relationship with respect to the desired count value and an angular difference between the predetermined stroke position and the desired sparking time, all of the entries at positions $x_{k+1} \ldots x_N$ for engine speeds greater than the predetermined speed value having a second relationship with respect to the desired count value and an angular difference between the predetermined stroke position and the desired sparking time, the first and second relationships having a predetermined ratio Q so that like angular differences at positions $x_k$ and $x_{k+1}$ for the values of $y_h$ have the ratio Q, where $y_h$ is selectively $y_1 \ldots y_M$; and means for comparing the desired count with the number of periods of a selected first or second fixed frequency waveform occurring during an interval between the predetermined stroke position and sparking, the first and second fixed frequency waveforms having periods differing by said predetermined ratio Q, the first fixed frequency waveform being compared in response to all engine speeds no greater than the predetermined value, the second fixed frequency waveform being compared in response to all engine speeds greater than the predetermined value.

2. The apparatus of claim 1 wherein the means for comparing includes first and second fixed frequency sources, means for determining when the desired count signal equals the number of periods in one of the fixed frequency sources, and means for selectively coupling the waveform from one of the first and second sources to the means for determining in response to the speed being respectively above and below the predetermined value.

3. The apparatus of claim 1 wherein the means for comparing includes a counter set in response to the desired count, said counter including a count input responsive to the selected waveform and deriving an output in response to the count set therein being equal to the number of periods of the selected waveform.

4. The apparatus of claim 3 wherein the means for comparing includes first and second fixed frequency sources, and means for selectively coupling the waveform from one of the first and second sources to the counter in response to the speed being respectively above and below the predetermined value.

5. A spark timing control device for an internal combustion engine having a crankshaft, comprising:
 (a) means for producing a reference angle pulse in response to said crankshaft rotating to a predetermined reference position before top dead center;
 (b) means for monitoring engine load;
 (c) means for deriving a parameter representing the engine speed in response to at least the latest pair of successive reference angle pulse intervals and for deriving a parameter representing the engine load interval simultaneous with the interval during which the engine speed parameter is derived in response to the engine load monitoring means;
 (d) means for storing plural signals representing first and second sets of time durations beginning with said reference positions and extending to the onset of sparking before top dead center corresponding to engine speed and load parameters;
 (e) means responsive to said determined engine speed and load parameters for determining from said storing means a value representing a spark time duration, said spark time duration determining means selecting from said first and second sets of spark time durations in response to the engine speed being less than and greater than a predetermined value, respectively;
 (f) a first clock pulse generator for deriving a first clock pulse signal;
 (g) a second clock pulse generator for deriving a second clock pulse signal, the second pulse signal having a relatively short period compared to the period of the first signal;
 (h) means responsive to said calculated engine speed for selecting said first and second clock pulse signals in response to the engine speed being respectively less than and greater than said predetermined value; and
 (i) means responsive to said value representing the time duration determined from the storing means and to the latest reference angle pulse for counting clock pulses of the selected clock pulse signal and deriving a spark signal in response to the number of counted clock pulses being equal to said value representing the determined time duration, the first set of time durations having a first predetermined relation of count values to angular deviation between the reference position and the onset of sparking, the second set of time durations having a second predetermined relationship of count values to angular deviation between the reference position and the onset of sparking, the first and second predetermined relationships being such that for adjacent values of engine speed for the same load corresponding angular deviations have count values with a predetermined ratio, the ratio increasing for the higher adjacent engine speed value, the first and second clock pulses having frequencies differing from each other by the predetermined ratio.

* * * * *